June 13, 1944.  E. TYDEN  2,351,082
FLOW RESPONSIVE ALARM VALVE
Filed March 9, 1942
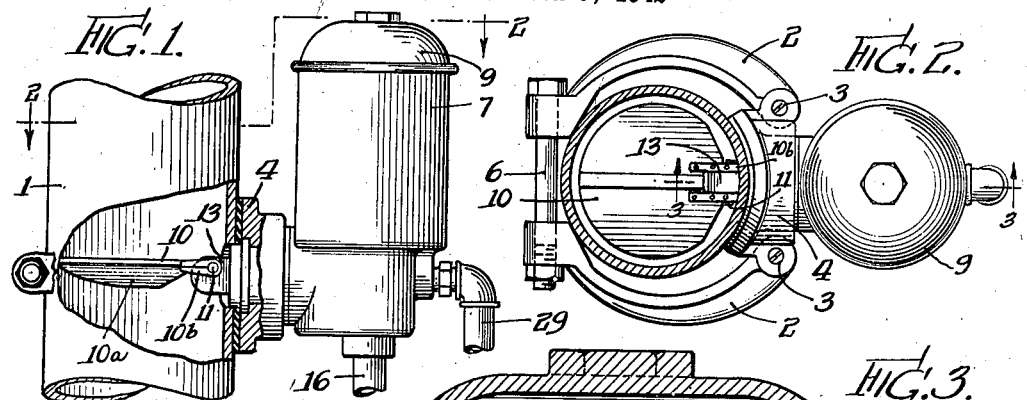
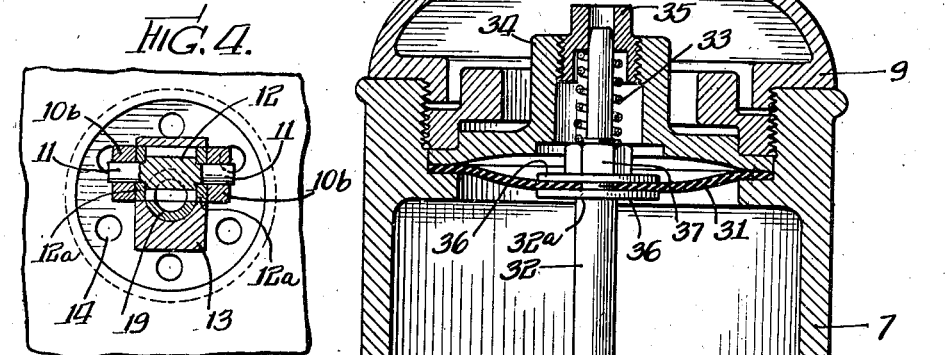
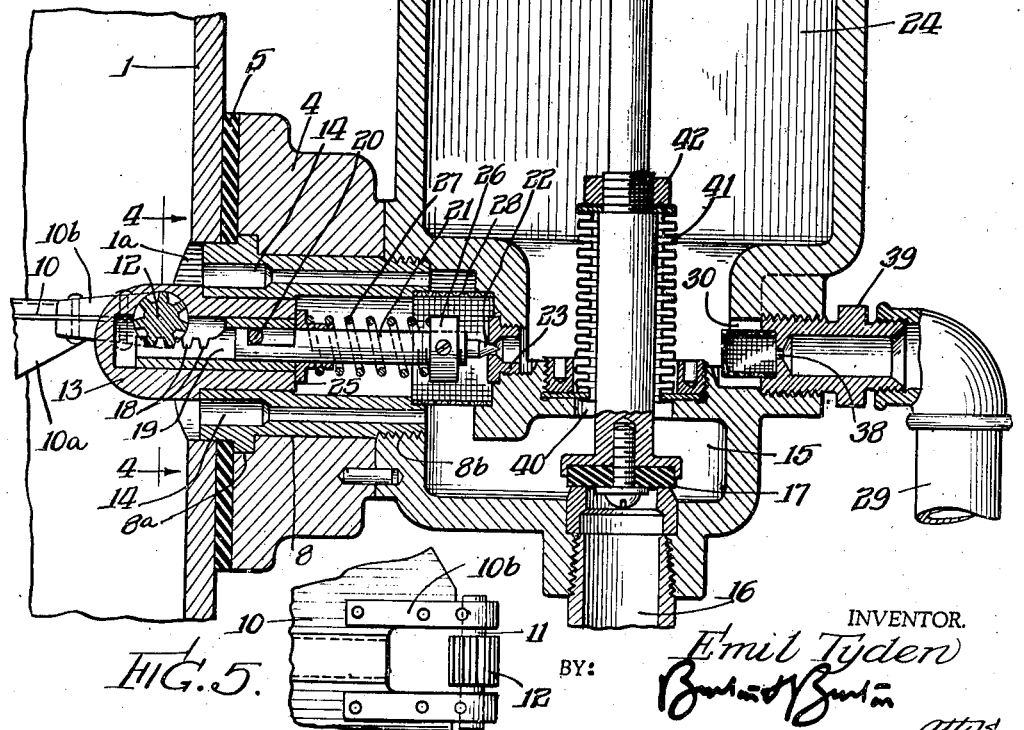
INVENTOR.
Emil Tyden Patented June 13, 1944

2,351,082

UNITED STATES PATENT OFFICE 2,351,082

FLOW RESPONSIVE ALARM VALVE

Emil Tyden, Hastings, Mich.

Application March 9, 1942, Serial No. 433,884

5 Claims. (Cl. 169—23)

This invention relates to a fluid-flow indicator which may include an alarm device and which is adapted for use with a water distribution system as, for example, that employed in fire-extinguishing sprinkler installations. In such a system, when the flow of water starts, it may be occasioned either by the opening of a sprinkler head as the result of a rise in temperature caused by an actual fire, or it may be evidence of a leak or accidental breakage of a sprinkler head, or some other portion of the apparatus, which might cause considerable damage if there were no fire; accordingly, it is always important that the commencement of such flow be promptly indicated.

One object of the present invention is to provide an economical and reliable mechanism arranged for actuation by fluid flow and provided with connections for operating an alarm device to give notice of such flow.

Another object of the invention is to provide a fluid-flow actuated mechanism, arranged to control a fluid-flow actuated alarm device and employing for both purposes the fluid from the flow passage with which it is associated.

It is a further object of the invention to simplify the structure so as to require only a single opening in the flow passage through which the flow-responsive mechanism operates, and through which fluid is supplied under control of said mechanism for actuating an alarm device.

It is also an object of the invention to provide a flow-responsive alarm mechanism which will be sensitive enough to respond to temporary surges or movements of the fluid, but which includes means for delaying the actuation of the alarm for a limited period, so that such temporary movements shall not result in a false alarm.

Other objects and advantages of the invention will appear from the following description taken in connection with the drawing, in which:

Fig. 1 is a side elevation of a flow-responsive device, together with a fragmentary portion of a flow passage to which it is applied, a portion of the wall of the passage being broken away and shown in section.

Fig. 2 is taken as a horizontal section, as indicated at line 2—2 on Fig. 1, cutting through the pipe or flow passage, but showing the flow-responsive device in top plan view.

Fig. 3 is a substantially medial, vertical section, taken as indicated at line 3—3 on Fig. 2, but on a much larger scale to show details of construction of the mechanism.

Fig. 4 is a vertical, detail section, taken as indicated at line 4—4 on Fig. 3.

Fig. 5 is a fragmentary plan view, showing the actuating pinion associated with the flow-responsive vane.

While there is shown and described herein certain specific construction embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

The pipe or flow passage to which the device embodying this invention is applied is indicated at 1 as a vertically extending conduit which may be a supply line for a fire-extinguishing sprinkler system. At one side an opening 1$^a$ is cut in the wall of the pipe 1 and the alarm mechanism is secured in place by means of a clevis or clamping ring which includes two arms 2, 2 each secured by a pivot 3 to a pad 4, which is formed to fit snugly against the outer surface of the pipe 1 with suitable packing 5 interposed. A clamping bolt 6 connects the free ends of the arms 2, 2 and completes the securement, since the remainder of the mechanism, including a receptacle 7, is attached to or mounted within the pad 4. A plug 8 fitted snugly in a bore in the pad 4 is formed with a head portion which enters the opening 1$^a$ in the pipe 1, and which includes a flange 8$^a$ serving to press the packing firmly against the surface of the pipe to insure a water-tight joint, while the threads 8$^b$ at the other end of the plug engage in the wall of the receptacle 7 to secure it to the pad 4. At the top the receptacle 7 is closed by a screw cap 9.

The flow-responsive vane 10 which extends into the passage 1 is provided with a reinforcing rib 10$^a$ and with supporting arms 10$^b$ which are secured rigidly to a pivot shaft 11 carrying a gear pinion 12 (see Fig. 5). The pivot 11 is fitted with washers 12$^a$ which are journaled in a supporting plug 13 secured tightly in substantially axial position in the plug 8. In the exposed annular portion of the head of the plug 8, around the smaller plug 13, there are arranged a plurality of ports or passages 14 providing constant communication between the interior of the flow passage 1 and a lower chamber 15 of the receptacle 7. This lower chamber is provided with an outlet pipe 16, which may be understood as leading to a water-operated alarm device of any familiar type; usually such devices include a small water motor which actuates the clapper of an alarm gong. Normally, however, a valve 17 closes the pipe 16 and prevents the outflow of water from the chamber 15 to the alarm device. But when actual flow commences in the passage 1, it is the purpose of the mechanism embodying this invention to cause the valve 17 to open, thus admitting water under pressure to the pipe 16 for actuating the alarm device and giving notice of the fact that flow has commenced.

For thus controlling the operation of the valve 17, the pinion 12, which is fast on the pivot shaft 11 and will, therefore, turn with any movement of the vane 10, is meshed with rack teeth 18 cut in the walls of a tubular rack member 19 which is slidably mounted in the plug 13. A cross pin 20 in the rack member 19 engages one end of a slot in the stem 21 of a valve 22 as seen in Figure 3, thus providing a one-way drive connection between the rack member and the valve stem. The said vane 22 normally closes a small port formed in the valve seat 23 and leading to the upper chamber 24 of the receptacle 7. The valve stem 21 is slidable through a flanged collar 25 seated against the shoulder formed by the end of the plug 13, and is fitted with a collar 26 so that a spring 27 reacting between said collars holds the valve 22 normally closed and also holds the vane 10 at its normal, horizontally extended position in the passage 1. But when the flow commences in an upward direction through the pipe 1 and swings the vane 10 upwardly, the pinion 12 is rotated and the member 19 is moved in its guideway in the plug 13 so as to withdraw the valve 22 from its seat. The valve seat is shown surrounded by a screen 28 to prevent dirt or sand in the water from clogging the valve seat, but the water itself entering through the passages 14 has free access to the port in the valve seat 23, and thus enters the chamber 24 when the valve 22 is opened. If the movement of the vane is only temporary, being caused by a surge or other momentary movement of the water, so that the vane promptly returns to its normal horizontal position and allows the valve 22 to close, the relatively small quantity of water which has entered the chamber 24 will leave the chamber by way of a drain pipe 29 connected into a port 30 in the lower portion of the chamber 24.

But if the vane 10 has been swung upwardly by actual flow which continues for any considerable period, the water entering the chamber 24 past the valve 22 will gradually fill the chamber so that the air pocketed above the accumulating water will be compressed against a flexible diaphragm 31 in the top of the chamber 24. This diaphragm is connected to the stem 32 of the valve 17 so that upward movement of the diaphragm 31 operates to open the valve 17 admitting water to the pipe 16 for actuating the alarm device (not shown). A spring 33 housed in a cap member 34 above the diaphragm 31 normally holds the valve 17 in closed position, and the tension of the spring may be varied by an adjusting nut 35 which is screwed into the cap 34 and serves as a guide for the upper end of the stem 32. The stem is shouldered at 32ᵃ so that the diaphragm 31 may be secured between clamping washers 36 by means of a clamping nut 37 on the reduced threaded portion of the stem 32.

Thus as long as the flow continues in the pipe 1, so as to hold the vane 10 at an angle to its normal, horizontal position, the valve 22 will be held open and the chamber 24 will be kept supplied with sufficient water to hold the diaphragm 31 in its upper position and hold the valve 17 open; but, upon cessation of the flow in the pipe 1, the vane 10 will return to horizontal position and the valve 22 will be seated by its spring 27; thereupon the water in chamber 24 will drain through the pipe 29 and as the level recedes in said chamber the diaphragm 31 will be pressed toward its lower position by the spring 33 and the valve 17 will be closed, thus cutting off the water pressure supplied to the alarm device through the pipe 16 and stopping the operation of the alarm. In the event of a temporary surge or downward movement of the water in the passage 1, the spring 27 will allow the vane 10 to swing downwardly, moving the rack member 19 and collar 25 in the direction to compress the spring 27, while the valve 22 remains seated.

It will be understood that in order to permit the water to accumulate in the chamber 24, so as to actuate the diaphragm 31 and valve 17, as just described, the vent port 38 in the fitting 39 to which the vent pipe 29 is connected will be of smaller capacity than the port controlled by the valve 22, since the port 38 is open at all times and the water will begin to flow therefrom as soon as it is admitted by the valve 22. The valve stem 32 extends through an opening 40 in the upper wall of the chamber 15, in order to transmit motion from the diaphragm 31 to the valve 17. But the upper chamber 24 must be sealed from the lower chamber 15 to prevent the water, which constantly occupies the lower chamber, from leaking into the upper chamber and possibly giving a false alarm. Therefore, a corrugated, flexible cylinder of the Sylphon type is shown at 41 with one end secured around the opening 40 and with its upper end clamped in sealing engagement with the valve stem 32 by means of a nut 42 thereon.

It will be seen that the mechanism embodying this invention is of a relatively simple character, comprising only a few parts which can be manufactured economically and which may be easily adjusted to operate effectively when the device is installed. Furthermore, it provides for operation of an alarm device by making use of a portion of the water present in the passage with which the mechanism is associated for indicating flow.

I claim as my invention:

1. In combination with a flow passage, a flow indicator including a vane extending into the passage, said passage having a single lateral opening, a plug secured in said opening and supporting said vane swingably for response to flow in the passage, a conduit leading through said plug to an alarm mechanism, a normally closed alarm valve controlling delivery of liquid to said mechanism, a chamber having a movable wall connected to the alarm valve and having an inlet port communicating with the aforesaid conduit, a normally closed valve controlling said port, and operating means extending through said plug from said vane to the controlling valve to open it in response to flow in the passage, the resulting accumulation of liquid in the chamber actuating its said movable wall to open the alarm valve.

2. In combination with a flow passage, a flow indicator including a vane extending into the passage, said passage having a single lateral opening, a plug secured in said opening and supporting said vane swingably for response to flow in the passage, a receptacle attached to the plug and having two chambers, one of said chambers having constant communication with the flow passage through said plug, a conduit leading from said chamber to an alarm device, an alarm valve controlling said conduit, the other chamber having an inlet port affording communication with the first chamber, a control valve for said port, and means extending through said plug connecting said control valve to said vane, whereby the swing of the vane in response to flow in the passage opens the control valve admitting liquid to the said other chamber, said other chamber having means movable by accumulation of liquid therein and operatively connected to the alarm valve for opening it.

3. A flow indicator comprising a vane normally extending across a flow passage and pivoted to swing in response to flow therein, a pinion fixed to the vane at its pivot axis, a rack member meshed with the pinion, a fixed plug in which the rack is guided for reciprocation in response to swing of the vane, a valve having a stem extending from the end of the rack member and telescopically engaged therewith, a one-way driving connection between the valve stem and the rack member operable to unseat the valve when the vane swings away from normal in one direction, the valve stem having a shoulder, and a spring reacting between said shoulder and said end of the rack member and resiliently seating the valve when the vane stands at normal position and yielding when the vane swings away from said normal in the opposite direction.

4. In a flow indicator as defined in claim 3, a loose collar on the valve stem interposed between the said spring and the end of the rack member and dimensioned to overlap and bear against the plug, whereby the spring maintains the vane yieldingly at its normal position when the valve is seated.

5. In combination with a vertically extending flow passage, a flow indicator including a vane normally extending in horizontal direction across said passage and pivoted to swing in response to flow therein, a pinion fixed to the vane at its pivot axis, a rack member meshed with the pinion, a fixed plug in which the rack is guided for reciprocation in response to swing of the vane, a conduit leading through said plug to an alarm mechanism, a valve controlling said conduit and having a stem extending from the end of the rack member and telescopically engaged therewith, a one-way driving connection between the valve stem and the rack member operable to unseat the valve when the vane swings away from its normal horizontal position in one direction, the valve stem having a shoulder, a spring reacting between the said shoulder and said end of the rack member, and a loose collar on the valve stem interposed between the spring and the end of the rack member and dimensioned to overlap and bear against the plug, whereby said spring resiliently seats the valve when the vane stands at its normal horizontal position and also supports the vane yieldingly in said horizontal position, said spring yielding when the vane swings away from said normal position in the opposite direction.

EMIL TYDEN.